US009112913B2

(12) United States Patent
Giguiere et al.

(10) Patent No.: US 9,112,913 B2
(45) Date of Patent: *Aug. 18, 2015

(54) DISTANCE-MODIFIED SECURITY AND CONTENT SHARING

(71) Applicant: Eventure Interactive, Inc., Costa Mesa, CA (US)

(72) Inventors: Gannon K. Giguiere, Newport Beach, CA (US); Alan L. Johnson, Newport Beach, CA (US); Timothy J. Lyons, Tustin, CA (US)

(73) Assignee: Eventure Interactive, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,258

(22) Filed: Feb. 26, 2014

(65) Prior Publication Data

US 2015/0121451 A1    Apr. 30, 2015

Related U.S. Application Data

(63) Continuation of application No. 14/068,957, filed on Oct. 31, 2013, now Pat. No. 8,769,610.

(51) Int. Cl.
  *H04L 29/06*      (2006.01)
(52) U.S. Cl.
  CPC ...................... *H04L 63/20* (2013.01)
(58) Field of Classification Search
  CPC .......... H04L 63/20; H04L 63/10; G06F 21/60
  USPC ............................................................ 726/1
  See application file for complete search history.

(56) References Cited

U.S. PATENT DOCUMENTS

| 7,613,426 | B2   | 11/2009 | Kuehnel |
| 7,802,305 | B1 * | 9/2010  | Leeds ............................. 726/26 |

(Continued)

FOREIGN PATENT DOCUMENTS

| WO | 2004107681 A1 | 12/2004 |
| WO | 2005018142 A1 | 2/2005  |
| WO | 2012006446 A1 | 1/2012  |

OTHER PUBLICATIONS

Bhargava, Bharat K., et al; A Trust-based Approach for Secure Data Dissemination in a Mobile Peer-to-Peer Network of AVs; International Journal of Next-Generation Computing, vol. 3, No. 1, Mar. 2012.

(Continued)

*Primary Examiner* — Joseph P Hirl
*Assistant Examiner* — J. Brant Murphy
(74) *Attorney, Agent, or Firm* — Fish & Tsang LLP

(57) ABSTRACT

In one aspect of the invention, a system for sharing resources in an ad-hoc peer-to-peer network is presented. The ad-hoc peer-to-peer network includes a host device that is associated with a resource. A security application of the host device allows the user of the host device to share the resource with other devices in the network. The security application also allows the user to establish access policies for certain known devices within the network. An access policy established for a known device specifies what rights the known device has with respect to accessing the resource. The access policy has the characteristics of inheritance. Thus, when a device requests to access the resource, the security application of the host device determines an access policy for the device based on access policies of one or more of the known devices.

17 Claims, 3 Drawing Sheets

(56) References Cited

U.S. PATENT DOCUMENTS

| | | |
|---|---|---|
| 7,904,720 B2 * | 3/2011 | Smetters et al. ............. 713/175 |
| 7,907,934 B2 | 3/2011 | Naghian |
| 7,974,574 B2 | 7/2011 | Shen |
| 8,135,835 B2 | 3/2012 | Wilbrink |
| 8,149,697 B2 | 4/2012 | Parkkinen |
| 8,181,257 B2 * | 5/2012 | Chalasani et al. ............. 726/26 |
| 8,478,300 B2 | 7/2013 | Kuehnel |
| 8,520,979 B2 | 8/2013 | Conwell |
| 2002/0147905 A1 * | 10/2002 | Perlman ........................ 713/157 |
| 2002/0165948 A1 * | 11/2002 | Vincent ........................ 709/223 |
| 2003/0115481 A1 * | 6/2003 | Baird et al. ................... 713/201 |
| 2004/0088548 A1 * | 5/2004 | Smetters et al. ............. 713/175 |
| 2004/0249888 A1 * | 12/2004 | Berkey et al. ................ 709/204 |
| 2005/0120215 A1 * | 6/2005 | Lehew et al. ................. 713/171 |
| 2005/0138186 A1 * | 6/2005 | Hesselink et al. ............ 709/229 |
| 2006/0039304 A1 * | 2/2006 | Singer et al. ................. 370/310 |
| 2006/0041561 A1 * | 2/2006 | Singer et al. ................. 707/10 |
| 2007/0014302 A1 * | 1/2007 | Vincent ........................ 370/401 |
| 2007/0157288 A1 * | 7/2007 | Lim ................................ 726/1 |
| 2007/0250482 A1 | 10/2007 | Yao |
| 2008/0069105 A1 * | 3/2008 | Costa et al. ................... 370/392 |
| 2008/0313700 A1 * | 12/2008 | Chalasani et al. ............. 726/1 |
| 2009/0287819 A1 * | 11/2009 | Iverson ........................ 709/225 |
| 2010/0005288 A1 * | 1/2010 | Rao et al. ..................... 713/151 |
| 2011/0258303 A1 * | 10/2011 | Nath et al. .................... 709/223 |
| 2012/0084364 A1 | 4/2012 | Sivavakeesar |
| 2012/0222092 A1 * | 8/2012 | Rabii .............................. 726/4 |
| 2013/0054643 A1 | 2/2013 | Yao |
| 2013/0160076 A1 | 6/2013 | Morita |
| 2013/0219285 A1 | 8/2013 | Iwasaki |

OTHER PUBLICATIONS

Desai, Nitin, et al; Infrastructure for Peer-to-Peer Applications in Ad-Hoc Networks; Computer and Information Science and Engineering Department; University of Florida.

Helal, Sumi, et al; Konark—A Service Discovery and Delivery Protocol for Ad-Hoc Networks; Computer and Information Science and Engineering Department, University of Florida, Gainesvile, Florida, 2010.

Castro, Marcel C., et al; Peer-to-Peer Overlay in Mobile Ad-hoc Networks; Work supported by the European Commission in the framework of the FP7 Network of Excellence in Wireless COMmunications NEWCOM++(contract No. 216715).

Sbai, Mohamed, et al., Revisiting P2P content sharing in wireless ad hoc networks; EPI Planete, Inria, France.

Gligor, Virgil D.; Security of Emergent Properties in Ad-Hoc Networks; University of Maryland, Electrical and Computer Engineering Department, College Park, Maryland.

* cited by examiner

DISTANCE-MODIFIED SECURITY AND CONTENT SHARING

This application is a continuation of U.S. patent application Ser. No. 14/068,957 filed on Oct. 31, 2013. This and all other referenced patents and applications are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is network access security, particularly, access security in an ad-hoc peer-to-peer network.

BACKGROUND

The following description includes information that may be useful in understanding the present invention. It is not an admission that any of the information provided herein is prior art or relevant to the presently claimed invention, or that any publication specifically or implicitly referenced is prior art.

Advances in portable devices that are capable of directly communicating with each other via short range wireless technology (e.g., direct WiFi, Bluetooth®, infrared, etc.) allow devices to form ad-hoc peer-to-peer networks anytime and anywhere (see "Infrastructure for Peer-to-Peer Applications in Ad-hoc Networks" by Desai et al. and U.S. Pat. No. 8,520,979 issued to Conwell entitled "Methods and Systems for Content Processing", filed Nov. 14, 2008). These networks are formed when two or more portable devices are communicatively coupled to each other via short range wireless connections without depending on any pre-existing network infrastructure such as a server, an access point, etc. Once connected to the network, a device can potentially access content (e.g., documents, photos, videos, etc.) or resources of and/or connected to other devices (e.g., printer, camera, data storage, etc.) on the network. Conversely, the device can also share its content or resources to the other devices connected to the network.

However, these seemingly convenient peer-to-peer network architectures also raise new security issues that were not present in conventional network architectures. For example, since a peer-to-peer network allows devices to join the network and access resources in the network by merely connecting to any one of the devices that is part of the network, it is a challenge to devise a meaningful security policy for all of the resources within the network.

Efforts have been made in the area of providing better security to ad-hoc peer-2-peer networks. For example, the publication "A Trust-based Approach for Secure Data Dissemination in a Mobile Peer-to-Peer Network of aerial vehicles (AVs)" by Bhargava et al. discloses providing different access to different AVs within the network based on a trustworthiness score assigned to each AV. The trustworthiness score for each AV is determined by a set of factors such as history of interactions with that AV, location, distance, authentication level, etc.

U.S. Pat. No. 7,907,934 issued to Naghian entitled "Method and System for Providing Security in Proximity and Ad-hoc Networks", filed Sep. 9, 2004, also discloses a method for providing security in a mobile ad-hoc network based on the location of the device requesting for access.

U.S. Pat. No. 8,149,697 issued to Parkkinen et al. entitled "System, Method, and Computer Program Product for Dicovering Services in a Network Device", filed Jun. 26, 2008, discloses providing security in an ad-hoc peer-to-peer network based on degree of separation between the owner of the resource and the device that wishes to access the resource;

Other efforts that have been made in this area includes:
- U.S. Pat. No. 7,613,426 issued to Kuehnel et al. entitled "Proximity Service Discovery in Wireless Networks", filed Dec. 20, 2005;
- U.S. Pat. No. 7,974,574 to Shen et al. entitled "Base Station Initiated Proximity Service Discovery and Connection Establishment", filed Jul. 25, 1007;
- U.S. Pat. No. 8,135,835 issued to Wilbrink et al. entitled "Hardware and Processing Request Brokerage", filed May 12, 2005;
- U.S. Patent Publication 2007/0250482 to Yao et al. entitled "Method and Apparatus for Document Matching", filed Apr. 25, 2006;
- U.S. Patent Publication 2012/0084364 to Sivavakeesar entitled "Scalable Secure Wireless Interaction Enabling Methods, System and Framework", filed Oct. 5, 2010;
- U.S. Patent Publication 2013/0160076 to Morita entitled "Access Authority Generation Device", filed Feb. 26, 2013; and
- U.S. Patent Publication 2013/0219285 to Iwasaki entitled "Mirrored Interface Navigation of Multiple User Interfaces", filed Feb. 21, 2012.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The publications listed above address only some but not all security issues in an ad-hoc peer-to-peer network. Thus, there is still a need for providing a more secured architecture for an ad-hoc peer-to-peer network.

SUMMARY OF THE INVENTION

Various objects, features, aspects and advantages of the inventive subject matter will become more apparent from the following detailed description of preferred embodiments, along with the accompanying drawing figures in which like numerals represent like components.

The inventive subject matter provides systems and methods for securely managing and sharing resources within an ad-hoc peer-to-peer network. As used herein, the term "ad-hoc peer-to-peer network" means a decentralized wireless network that allows devices within range to discover and communicate with each other without involving a central access server (e.g., a central access point) or a pre-existing networking infrastructure. As such, an ad-hoc peer-to-peer network can be created spontaneously. Devices can join and leave the network as they wish seamlessly without affecting the connectivity between other devices within the network.

In one aspect of the invention, a method of managing resources in such an ad-hoc peer-to-peer network is presented. The method includes a step of establishing an ad-hoc peer-to-peer network for several devices. The devices within the ad-hoc peer-to-peer network include mobile devices (e.g., smart phones, tablets, laptops, etc.) and/or stationary devices (e.g., smart routers). The devices include a first device that is associated with a first resource. The first device is directly connected to a second device in the ad-hoc peer-to-peer network. The first resource can include hardware (e.g., camera, printer, hard drive, camcorder, a vehicle, an equipment, etc.), software (e.g., an application, a game, etc.), media content (e.g., audio data, video data, image data, etc.) and/or documents (e.g., text documents, spreadsheets, etc.).

The method also includes a step of granting the second device access to the first resource according to an access policy. The access policy specifies a set of rights for accessing the first resource. The set of rights can include at least one of the following: copy, write, read, contribute, and delete.

The method includes a step of receiving a request for access to the first resource from a third device. The third device is indirectly connected to the first device in the ad-hoc peer-to-peer network via the second device. In some embodiments, the access policy granted to the second device has the characteristics of inheritance, such that other devices connected to the first device via the second device can inherit the access policy from the second device. As such, the method also includes a step of determining an access policy for the third device for accessing the first resource based on the access policy granted to the second device. In some embodiments, the access policy determined for the third device can be identical to the access policy granted to the second device. In other embodiments, the access policy determined for the third device specifies a subset of the set of rights specified by the access policy granted to the second device.

The subset of the set of rights can limit the rights quantitatively and/or qualitatively. For example, if the access policy for the second device allows the second device to access a document, the access policy for the third device may allow the third device to access only a portion of a document or a degraded (e.g., lower resolution, redacted, excluding metadata, etc.) version of the document, or both. In another example, if the access policy for the second device allows the second device to access a set of features of the resource (e.g., copy, print, scan features of a printer), the access policy determined for the third device might include only a subset of the set of features.

In addition to the second device, the third device in some embodiments is indirectly connected to the first device via a fourth device. In some of these embodiments in which an access policy has also been granted to the fourth device, the access policy for the third device is determined based on both access policies of the second and the fourth devices.

When the access policies of the second and the fourth devices share a common set of rights, the access policy determined for the third device can specify either that common set of rights, or a subset of that common set of rights. In an extreme example in which the access policies of the second and the fourth devices do not share any common rights, the access policy determined for the third device specifies no rights to access the first resource.

DETAILED DESCRIPTION

Figure 1:
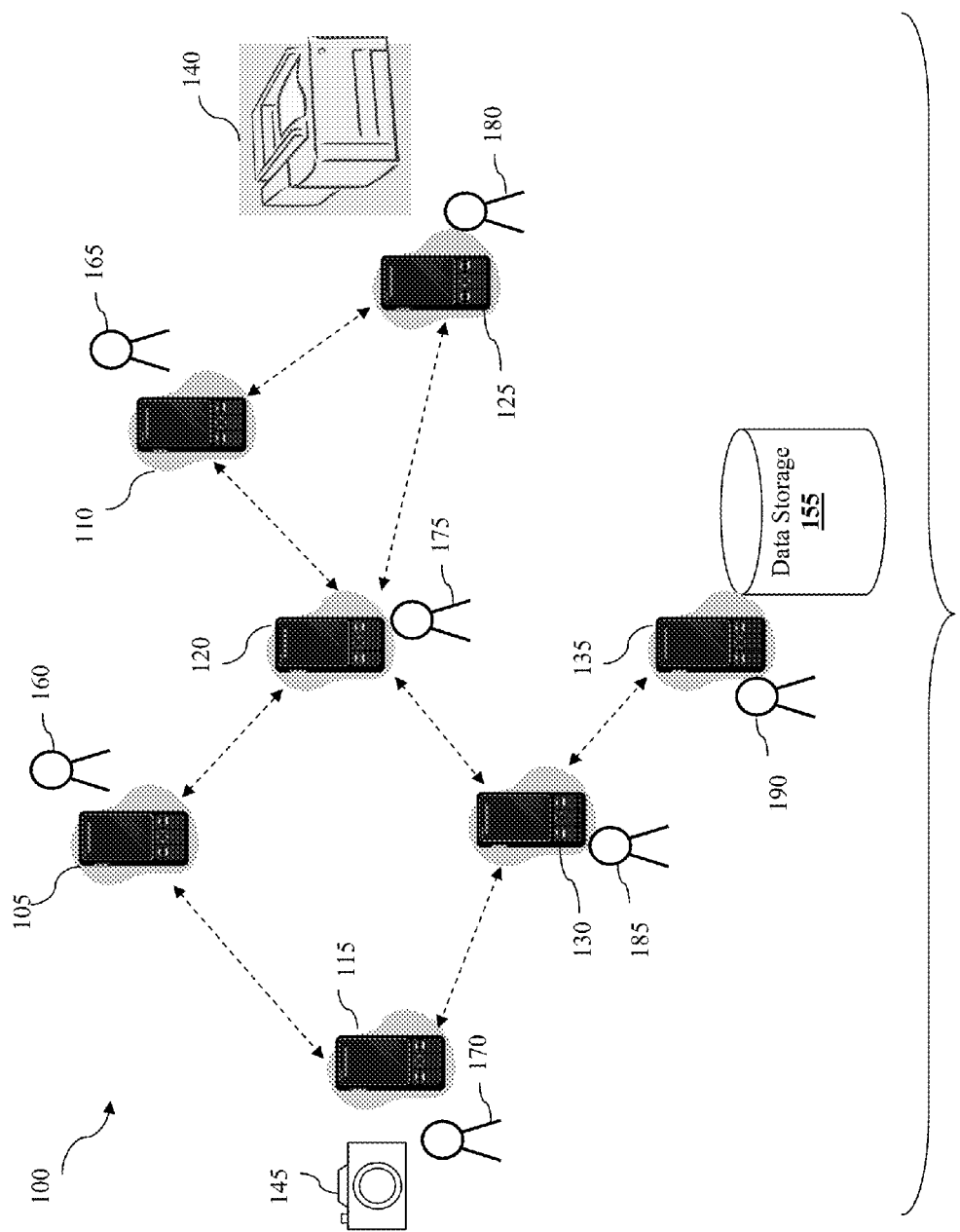
FIG. 1 illustrates an example ad-hoc peer-to-peer network.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter provides systems and methods for securely managing and sharing resources within an ad-hoc peer-to-peer network. As used herein, the term "ad-hoc peer-to-peer network" means a decentralized wireless network that allows devices within range to discover and communicate with each other without involving a central access server (e.g., a central access point) or a pre-existing networking infrastructure. As such, an ad-hoc peer-to-peer network can be created spontaneously. Devices can join and leave the network as they wish seamlessly without affecting the connectivity between other devices within the network.

Range for ad-hoc peer-to-peer networks is typically 500 feet or less, but where such networks use cellular technology or wired communication links, the range could be any practical distance.

At least one of the devices within the ad-hoc peer-to-peer network can be associated with a resource, by including a resource within the device or is communicatively coupled with a resource. The resource can include a hardware (or sub-device) such as a printer, a camera, a speaker, etc. The resource can also include data (e.g., media content such as audio data and video data, text documents, etc.). Once a device has joined the ad-hoc peer-to-peer network, the device can be configured to share the associated resource(s) with others in the network.

FIG. 1 illustrates an example ad-hoc peer-to-peer network 100. The ad-hoc peer-to-peer network 100 includes several mobile devices 105-135. These mobile devices 105-135 can include any device that is capable of establishing a direct wireless communication with another portable device. Examples of these mobile devices include mobile phones, smart phones, tablets, laptops, portable game consoles, etc. Although the devices that are part of the ad-hoc peer-to-peer network 100 as illustrated include only mobile devices, it is contemplated that other stationary devices such as smart routers can be included as part of the ad-hoc peer-to-peer network 100 as well. In fact, any of the mobile devices 105-135 shown in the ad-hoc peer-to-peer network 100 can be replaced by a stationary device. Unlike a conventional router, a smart router is a device that can perform functionalities other than mere forwarding and routing data, it could have processing power and memory. For example, when one uses a smart phone as a hub (e.g., a WIFI hot spot) to send and receive cellular or WIFI signals, the smart phone in that sense is acting as a smart router. One could also have dedicated smart routers.

An ad-hoc peer-to-peer network can be formed according to any viable network topology (e.g., star topology, mesh topology, tree topology, etc.). In some embodiments, each mobile device within the network is directly connected all of the other mobile devices in the network such that the network follows a fully connected mesh network topology. As used herein, a direct connection between two devices exists when a communication link is established between the two devices (without using any routing or other intervening device). In other embodiments, at least one of the mobile devices in the network is directly connected to some, but not all, of the other devices in the network (i.e., a partially connected mesh network). Thus, in a partially connected mesh network, a mobile device can join and become part of an ad-hoc peer-to-peer network when it establishes a direct connection with one or more mobile devices that are part of the ad-hoc peer-to-peer network. A mobile device within the network can have a direct connection with as many as all other mobile devices within the network or as few as one other mobile device within the network.

The ad-hoc peer-to-peer network 100 in FIG. 1 is an example of a partially connected mesh network. As shown, mobile device 105 is directly connected to mobile devices 115 and 120, while mobile device 120 is directly connected to mobile devices 105, 110, 125, and 130. Mobile device 110 is directly connected to both mobile devices 120 and 125, and mobile device 125 is directly connected to both mobile devices 110 and 120. Mobile device 115 is directly connected to both mobile devices 105 and 130 while mobile device 130 is directly connected to mobile devices 115, 120, and 135. Mobile device 135 is only connected directly to mobile device 130.

Among the mobile devices within the ad-hoc peer-to-peer network 100, mobile device 135 has the least number of direct connections within the network 100 (i.e., one direct connection with mobile device 130) and mobile device 120 has the largest number of direct connections within the network 100 (i.e., four direct connections with mobile devices 105, 110, 125, and 130).

Some of the mobile devices within the network can also be associated with sharable resources. For example, mobile device 115 can include a built-in camera (or alternatively communicatively coupled with a camera), mobile device 125 can be communicatively coupled with a printer, and mobile device 135 includes a data storage 155. Data storage 155 can also include sharable data such as audio data, video data, text documents, etc.

Users 170, 180, and 190 of these mobile devices 115, 125, and 135 can decide to share their resources (e.g., camera, printer, data storage, etc.) with other devices within the ad-hoc peer-to-peer network 100. However, unlike the conventional networking infrastructure, the characteristics of an ad-hoc peer-to-peer network create challenges in securely sharing these resources with others within the network. Some of the challenges stem from the fact that it is very difficult or even impossible to find out which mobile device can potentially access the resource. As mentioned above, different mobile devices can join and leave the network spontaneously. In addition, mobile devices can potentially access the resources of a host device (i.e., a mobile device that hosts at least one resource) even if the mobile devices are not directly connected to the host device (the mobile devices can be connected to the host device via a number of hops—mobile devices via which data from the mobile device has to pass before reaching the host device within the network).

In one aspect of the invention, a system for sharing resources in an ad-hoc peer-to-peer network is presented. In some embodiments, the system provides a security application for each of the mobile devices connected to the ad-hoc peer-to-peer network. The security application of a host device allows the user to indicate which resource to share with other devices in the ad-hoc peer-to-peer network and to establish access policies for the known devices within the network with respect to the shared resource. The access policies established for the known devices can specify what features (e.g., photos/videos capturing feature, printing feature, data storage feature, data editing feature, etc.) and/or what data of the resource to which that the known devices has access.

Known devices can include devices that are directly connected to the host device in the ad-hoc peer-to-peer network and other devices that the user of the host device is aware to be part of the ad-hoc peer-to-peer network. For example, user 170 of host device 115 (that is hosting a camera resource 145) can decide to share the camera 145 as a shared resource with other devices within the network 100. Note that in this example any of the various mobile devices 105. 110, 115, 120, 125, 130 and 135 could act as the host device, and the host device can change over time, as for example if the current host device 115 leaves the ad-hoc peer-to-peer network 100.

The host device in the example of FIG. 1, (mobile device 115), can detect that at least devices 105 and 130 are directly connected to it, and allows the user 170 to establish access policies for devices 105 and 130. Additionally, in this example the user 170 can establish different access policies for these two devices 105 and 130. The access policy that the user 170 establish for each of the devices 105 130 specifies a set of rights for accessing the camera 145 by the device. The set of rights that can be included in the access policy for the camera 145 can include capturing a photo with the camera, viewing photos captured by the camera, and even contributing photos. In this example, the user 170 can specify that device 105 can only view photos captured by camera 145, but that device 130 can both view photos and capture photos with camera 145. For other types of resource, the access policy can also include other rights such as copy, write, read, contribute, and delete. In some embodiments, the user can establish an access policy that specifies no access whatsoever to the resource. In some embodiments, the access policies that are established for the known devices have the characteristics of inheritance, which will be explained in more detailed below.

Once the user of a host device indicates to the security application that a resource associated with the host device is to be shared with other device within the ad-hoc peer-to-peer network, the security application running on the host device is configured to broadcast a notification of this newly shared resource with the rest of the mobile devices within the network. In this example, the security application of mobile device 115 is configured to broadcast a notice of the newly shared camera 145 to devices 105, 110, 120, 125, 130, and 135. The security application running on the other devices can then present the resource a shared resource to the users (e.g., users 160, 165, 180, 185, and 190) of the other devices and allow those users to access the shared resource.

When a user of a requesting device makes a request to access the shared resource via the security application running on the requesting device, the security application prepares a request, and sends the request to the host device 115. Upon receiving the request at the host device 115, the security application running on the host device 115 will determine an access policy for the requesting device and will grant access to the requesting device based on the determined access policy. First, the security application of the host device 115 determines whether the requesting device is one of the known devices for which an access policy has been established by the user. If the requesting device is one of the known devices, the security application uses the access policy that has already been established for the requesting device.

On the other hand, if the requesting device is not one of the known devices, the security application looks at the path and all the intermediary devices that the request has passed through from the requesting device before reaching the host device. For example, referring back to FIG. 1, if requesting device 125 sends a request to access the camera 145 of host device 115, one of the possible paths for the request to travel to the host device 115 is to go through intermediary devices 120 and 105. For clarity, the term "upstream" will be used to describe the direction within the path from the requesting device to the host device and the term "downstream" will be used to describe the direction within the path from the host device to the requesting device. In the above example, the upstream direction of the path will include devices 120 and 105. Conversely, the downstream direction of the path will include devices 105 and 120. Additionally, the term "downstream devices" of a device within a path means all devices in the path that come after the device in the downstream direction, the term "upstream devices" of a device within a path means all devices in the path that come after the device in the upstream direction As mentioned above, the access policies established for known devices have the characteristics of inheritance. That is, the access policy of a device can be inherited from access policies of other upstream devices along the path of the request. In the above example, the access policy for mobile device 125 can be inherited from either device 105 or device 120 or both. Since device 105 is a known device for which an access policy has been established, the security application of host device 115 in this example will allow device 125 to inherit its access policy from device 105. Thus, the security application of host device 115 will grant device 125 access to view photos.

Alternatively, instead of inheriting the entire access policy from an upstream device, the security application can be configured to allow inheritance of only a portion of the access policy of the upstream device. Thus, when the upstream device is granted access to a set of rights according to its access policy, the requesting device downstream of the upstream device will get only a subset of those rights, thereby receiving a more limited access policy than the upstream device. The inherited access policy can be more limiting in a variety of ways, including but not limited to limiting in the types of access rights granted to the requesting device, the quantity of data allowed to be viewed by the requesting device (e.g., a subset of documents or only a portion of each document), the quality of the data allowed to be viewed by the requesting device, access to only a subset of features provided by the resource, etc.

For example, the security application of host device 115 can be configured by the user to grant devices 120 and 125 viewing access to only a portion of the photos taken by camera 145, or viewing access to a degraded set of photos (e.g., lower resolution, etc.) taken by camera 145. In yet other embodiments, the security application of the host device 115 can additionally be configured by the user to provide access to any devices that are downstream of the known device 105 in a cascading fashion, such that devices that are more separated to the known device 105 (e.g., device 125) has more limited access than devices that are closer to the known device 105 (e.g., device 120). Thus, one of the technical effects of this security system is that it allows user of the host device to set access levels for other devices in the ad-hoc peer-to-peer network 100 without being aware of which devices within the network have potential access to the associated resources.

In some embodiments, the access policy of a requesting device can be inherited by two or more upstream devices. If the user 170 of the host device 115 has previously established access policies for both devices 105 and 120, the requesting device 125 can inherit its access policy from the policies of both devices 105 and 120. When the two established access policies (for devices 105 and 120) specify different sets of rights, the security application can use different techniques to inherit different rights from these two policies. In some embodiments, the security application is configured to inherit only the common rights from the two policies, which most likely will result in a policy that is more limited than either of the two policies. In the most extreme case in which the access policies of devices 105 and 120 do not share any common rights, the device 125 will inherit no rights for its access policy. In other embodiments, the security application is configured to inherit all rights from both policies, which most likely will result in a policy that is broader than either of the two policies.

In some embodiments, instead of only looking at the path through which the request has passed to get from the requesting device and the host device, the security application can also look at other possible paths between the requesting device and host device, and thereby determine the access level for the requesting device based on all possible paths. An alternative path for the request might involve a known device with a broader (or more limited) access level than the known device in the original path. For example, instead of traveling through devices 120 and 105, the request from requesting device 125 to host device 115 can travel through devices 120 and 130 to reach host device 115.

The security application can be configured to use whatever path(s) would satisfy an appropriate rules set. For example, in some embodiments the security application could be configured in a manner that would result in the broadest access. In other embodiments the security application could be configured in a manner that would result in a narrower, or even the narrowest access.

Figure 2:
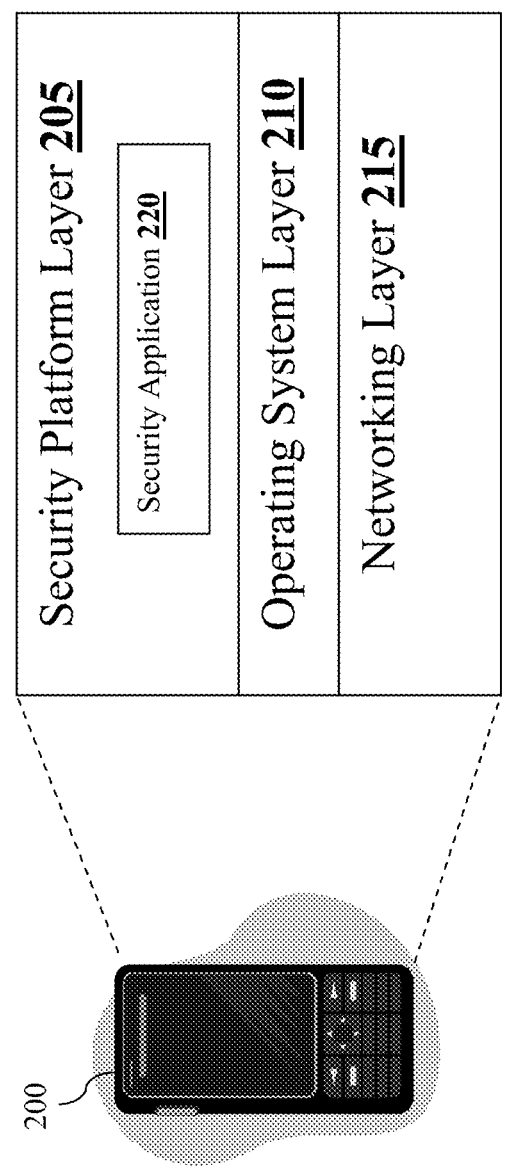
FIG. 2 illustrates different software layers within a mobile device.

FIG. 2 illustrates the security application with respect to the different software layers within a mobile device. As shown, an exemplary mobile device 200 includes a networking layer 215 that is responsible for managing transmitting and receiving data via a networking hardware (e.g., an Ethernet card, a WIFI card, etc.), an operating system layer 210 that is responsible for managing resources of the device, and a security platform layer 205 sitting on top of the operating system layer 210. The security platform layer 205 of some embodiments is responsible for managing the security of the mobile device 200 and all resources associated with the mobile device 200. In some embodiments, a security application 220 can be implemented within the security platform layer 205.

Further in FIG. 2, the security application of the mobile device 200 is configured to manage access to the resources that are associated with the mobile device. Specifically, the security application is configured to grant access to the associated resource based on the origin of the request (i.e., the requesting mobile device) and how the requesting mobile device is connected to the host device. The specific functionalities and features of the security application will be explained in more detailed below by reference to FIG. 3.

Figure 3:
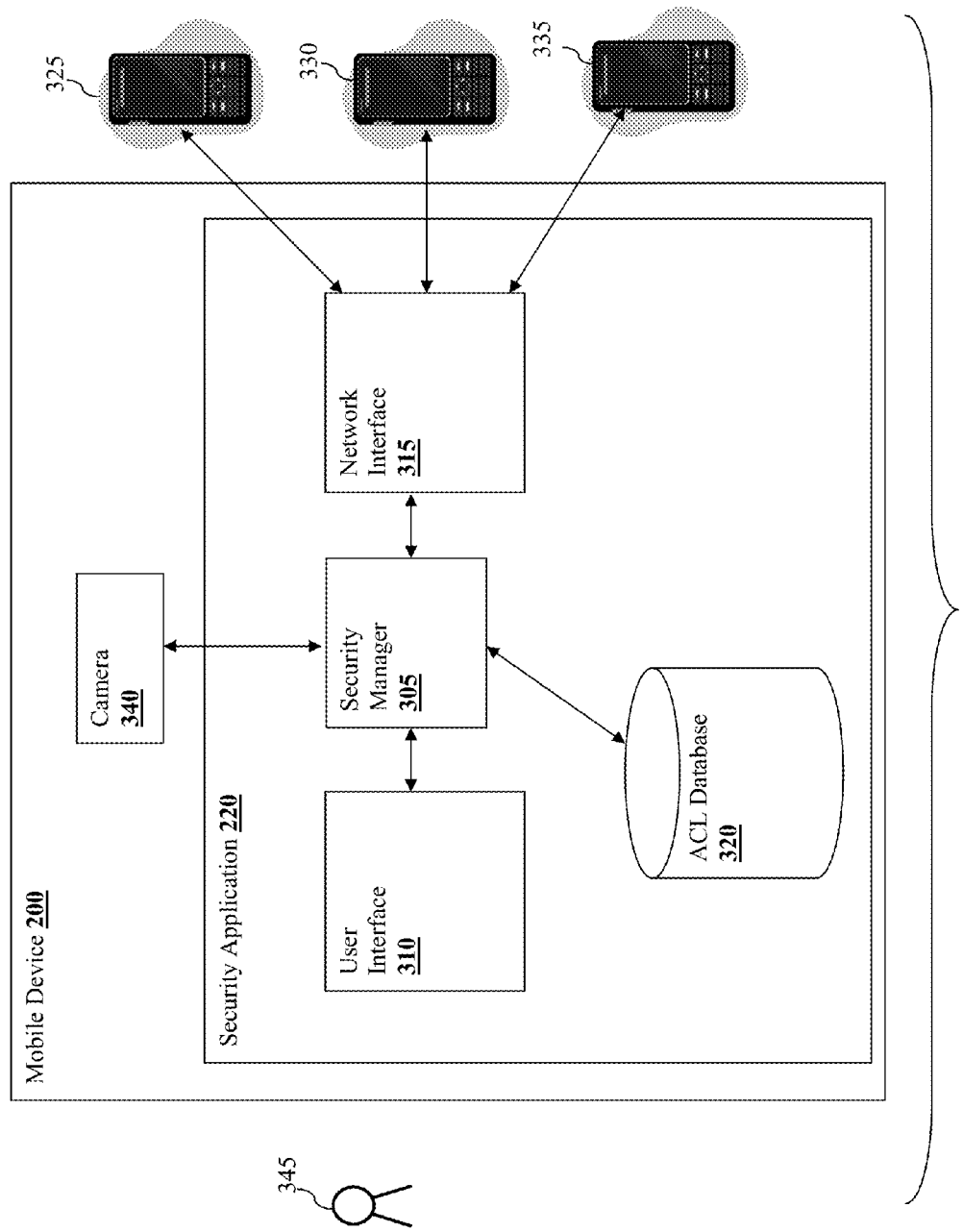
FIG. 3 illustrates an example security application of some embodiments.

FIG. 3 illustrates an example security application 220 that is implemented within the mobile device 200. The security application 220 includes a security manager 305, a user administration interface 310 configured to interface with a user 345 of the mobile device 200, and a network interface 315 configured to interface with mobile devices directly connected to the mobile device 200 (e.g., mobile devices 325, 330, and 335 in this example). The security application 220 can also be communicatively coupled with an access control list database 320 that is configured to store security data for the security application 220.

The security application can be configured to manage any sharable resource that is associated with the mobile device 200. In this example, the mobile device 200 has a built-in camera 340. The user 345 can add the camera 340 as one of the resources managed by the security application 220 via the user administration interface 310. Once a resource is specified to be managed by the security application 220, that resource can be shared with other mobile devices within the ad-hoc peer-to-peer network and any request to access the resource by other devices will be first directed to the security application 220.

The security application 220 allows the user 345 to configure different access levels for different known mobile devices to access the resource. Known mobile devices can be mobile devices that are directly connected to the mobile device 200 within the ad-hoc peer-to-peer network (e.g., mobile devices 325, 330, and 335 in this example). Known mobile devices can also be any devices that the user of mobile device 200 is aware that are part of the ad-hoc peer-to-peer network. Thus, in some embodiments, the security manager 305 is configured to provide a user interface for the user 345 of the mobile device 200 via the user administration interface 310 for configuring the different access levels. Through this user interface, the user 345 can assign different access levels for different resources associated with the mobile device 200 to different mobile devices.

For example, the user 345 can give mobile devices 325 and 330 access to view all photos captured by camera 340. The user 345 can also give mobile device 335 access to take pictures using camera 340 and view all pictures taken by camera 340. The access information associated with each resource can be stored in the access control list database 320.

In some embodiments, a security application identical to the security application 220 is installed in each of the other mobile devices within the ad-hoc peer-to-peer network. When a resource associated with a mobile device is being shared within the ad-hoc peer-to-peer network (i.e., when the user of the mobile device indicates that the resource is sharable within the network via the security application), the security manager 305 is configured to send a notification to all other mobile devices within the network about this newly sharable resource. In some embodiments, the notification includes the type of resources, capabilities of the resources (e.g., take photos, view photos, read, write, etc.), and identity of the host mobile device (e.g., a MAC address, IP address, name, etc.) within the network.

Thus, users of the other mobile devices can view what resources are available within the ad-hoc peer-to-peer network, and request access to any one of the resource via the security applications running on their mobile devices. For example, when a user of another device within the ad-hoc peer-to-peer network requests to access the camera 340, the security manager of that other device prepares a request that includes at least the following information: identify of the requesting mobile device (e.g., a MAC address, IP address, name, etc.), the resource for which the user 345 is requesting access, and identity of the host device (e.g., mobile device 200 in this example) that hosts the requested resource. The security manager of that device then sends the request to another mobile device within the network via the network interface based on the identity of the host device. If the requesting mobile device is directly connected to the host device, the security manager is configured to send the request directly to the host device. Otherwise, the security manager is configured to send the request to another mobile device within the network according to a routing table.

When the requesting device is not directly connected to the host device, the request will pass through one or more other mobile devices within the network before reaching the host device. When a request passes through an intermediary mobile device, the security application of the intermediary mobile device will perform several functions. First, the security manager will determine that the request is not for one of the resources associated with the intermediary mobile device. The security manager then inserts the identity of the intermediary mobile device into the request as part of the path of the request. Finally, based on the identity of the host device, the security manager acts as a router to route the request either to the host device if the host device is directly connected to the intermediary device, or to another intermediary device within the network according to the routing table.

Upon receiving the request to access resource at the host device 200, the security manager 305 reviews the information within the request and determines if the request (access) can be granted based on the identity of the requesting device and/or the identity of the intermediary devices that the request has passed through before reaching the host device.

As mentioned above, the user 345 can provide access information of known devices to the security application 220 via the user interface 310. Thus, the security manager 305 can search through the access control list database 320 to determine if the requesting device matches any one of the known devices listed in the access control list database 320. If the requesting device matches one of the known devices listed in the database 320, the security manager 305 will apply the access policy indicated in the database 320 for that requesting device.

On the other hand, if the requesting device is not any one of the known devices listed in the access control list database 320, the security manager 305 is configured to obtain an access policy for the requesting device based on the identity of the intermediary devices through which the request has passed before reaching the host device.

In some embodiments, the access policy for a mobile device can be inherited from the access policy of an upstream mobile device. Thus, in some of these embodiments, the security manager 305 is configured to retrieve the access policy of a known device listed in the access control list database 320 that matches the identity of one of the intermediary devices. For example, that known device can be the device that forwards the request to the host device (the device that is directly connected to the host device).

As mentioned above, the ad-hoc peer-to-peer network can include mobile devices as well as stationary devices (e.g., smart routers). Thus, the intermediary devices that the request has to pass through before reaching the host device can include mobile devices and/or stationary devices. It is contemplated that the same concept of access policy inheritance can be applied to stationary devices as well.

Once the access policy of the known device is retrieved, the security manager 305 can determine an access policy for the requesting device. In some embodiments, based on the inheritance characteristics of the access level, the security manager 305 can be configured to grant the same access policy for all other downstream devices from the known device. In other embodiments, the security manager 305 can be configured to determine a more limited access policy to all of the downstream devices from the known device. For example, if the known device has both read and write access to the host device's resource, the security manager 305 can determine that all downstream devices from that known device only has read access.

In addition, instead of granting the same access policy to all of the downstream devices from the known device, the security manager 305 can also determine different access levels to the downstream devices in a cascading fashion. That is, a downstream device that is further away (a higher degree of separation) from the host device will have a more limited access policy than a downstream device that is closer with (a lower degree of separation from) the host device. That way, less access rights will be given to mobile devices that are more remote (in terms of degree of separation) from the host device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of managing resources in an hoc peer-to-peer network, comprising:
   establishing an ad-hoc peer-to-peer network for a plurality of devices comprising a first device that is associated with a first resource, wherein the first device is directly connected to a second device in the peer-to-peer network;
   granting the second device access to the first resource according to an access policy that specifies a set of rights for accessing the first resource;
   receiving a request for access to the first resource from a third device indirectly connected to the first device in the peer-to-peer network via the second device;
   determining, by the first device, an access policy for the third device for accessing the first resource based on the access policy granted to the second device;
   configuring the first device to grant the third device access to the first resource according to the determined access policy;
   wherein the third device is also connected to the first device via a fourth device.

2. The method of claim 1, wherein the access policy determined for the third device specifies a subset of the set of rights specified by the access policy granted to the second device.

3. The method of claim 1, further comprising determining the access policy for the third device based on the access policies granted to both the second and forth devices.

4. The method of claim 3, wherein the access policies granted to the second and fourth devices share a common set of rights, wherein the access policy determined for the third device specifies a subset of the common set of rights for accessing the first resource.

5. The method of claim 3, wherein the access policies granted to the second and fourth devices do not share a common set of rights, wherein the access policy determined for the third device specifies no right for accessing the first resource.

6. The method of claim 1, wherein the set of rights comprises at least one of: copy, write, read, contribute, and delete.

7. The method of claim 1, wherein the first resource comprises a document.

8. The method of claim 7, wherein the access policy determined for the third device allows the third device to access only a portion of the document.

9. The method of claim 7, wherein the access policy determined for the third device allows the second device to access only a redacted version of the document.

10. The method of claim 1, wherein the resource comprises media content.

11. The method of claim 10, wherein the access policy determined for the third device allows the second device to access a portion of the media content.

12. The method of claim 10, wherein the access policy determined for the third device disallows the third device to access metadata of the media content.

13. The method of claim 10, wherein the access policy determined for the third device allows the third device to access a degraded version of the media content.

14. The method of claim 13, wherein the degraded version of the media content has a lower resolution than the media content.

15. The method of claim 1, wherein the resource comprises a service providing a set of features.

16. The method of claim 1, wherein the access policy determined for the third device allows the third device to access only a subset of features provided by the service.

17. The method of claim 1, wherein the second device is a smart router.

* * * * *